United States Patent
Yang et al.

(10) Patent No.: US 11,049,018 B2
(45) Date of Patent: Jun. 29, 2021

(54) TRANSFORMING CONVOLUTIONAL NEURAL NETWORKS FOR VISUAL SEQUENCE LEARNING

(71) Applicant: NVIDIA Corporation, Santa Clara, CA (US)

(72) Inventors: Xiaodong Yang, San Jose, CA (US); Pavlo Molchanov, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 828 days.

(21) Appl. No.: 15/880,472

(22) Filed: Jan. 25, 2018

(65) Prior Publication Data

US 2018/0373985 A1    Dec. 27, 2018

Related U.S. Application Data

(60) Provisional application No. 62/524,359, filed on Jun. 23, 2017.

(51) Int. Cl.
*G06N 3/08* (2006.01)
*G06K 9/00* (2006.01)
(Continued)

(52) U.S. Cl.
CPC ......... *G06N 3/082* (2013.01); *G06K 9/00718* (2013.01); *G06K 9/6267* (2013.01);
(Continued)

(58) Field of Classification Search
CPC .. G06N 3/0445; G06N 3/0454; G06N 3/0481; G06N 3/082; G06K 9/6267; G06K 9/00718
See application file for complete search history.

(56) References Cited

U.S. PATENT DOCUMENTS

2017/0083752 A1    3/2017  Saberian et al.
2017/0083796 A1    3/2017  Kim et al.
(Continued)

FOREIGN PATENT DOCUMENTS

CN    107220611 A    9/2017
WO    2016197381 A1  12/2016

OTHER PUBLICATIONS

Cakir et al., "Convolutional recurrent neural networks for polyphonic sound event detection," IEEE/ACM Transactions on Audio, Speech, and Language Processing, vol. 25, No. 6, 2017, pp. 1291-1303.

(Continued)

*Primary Examiner* — Shane D Woolwine
(74) *Attorney, Agent, or Firm* — Leydig, Voit & Mayer, Ltd.

(57) ABSTRACT

A method, computer readable medium, and system are disclosed for visual sequence learning using neural networks. The method includes the steps of replacing a non-recurrent layer within a trained convolutional neural network model with a recurrent layer to produce a visual sequence learning neural network model and transforming feedforward weights for the non-recurrent layer into input-to-hidden weights of the recurrent layer to produce a transformed recurrent layer. The method also includes the steps of setting hidden-to-hidden weights of the recurrent layer to initial values and processing video image data by the visual sequence learning neural network model to generate classification or regression output data.

20 Claims, 15 Drawing Sheets

(51) Int. Cl.
*G06N 3/04* (2006.01)
*G06K 9/62* (2006.01)

(52) U.S. Cl.
CPC ......... *G06N 3/0445* (2013.01); *G06N 3/0454* (2013.01); *G06N 3/0481* (2013.01)

(56) References Cited

U.S. PATENT DOCUMENTS

| | | | |
|---|---|---|---|
| 2017/0127016 A1* | 5/2017 | Yu | G06N 3/0445 |
| 2017/0161608 A1 | 6/2017 | Saon et al. | |
| 2017/0178346 A1* | 6/2017 | Ferro | G06K 9/6274 |
| 2017/0206405 A1* | 7/2017 | Molchanov | G06K 9/00355 |
| 2017/0345140 A1 | 11/2017 | Zhang et al. | |

OTHER PUBLICATIONS

Harutyunyan et al., "Combining CNN and RNN for spoken language identification," YearevaNN, Jun. 26, 2016, pp. 1-11.

Bengio et al., "Learning Long-Term Dependencies with Gradient Descent is Difficult," IEEE Transactions on Neural Networks, 1994, pp. 1-35.

Cho et al., "On the Properties of Neural Machine Translation: Encoder-Decoder Approaches," Proceedings of SSST-8, Eighth Workshop on Syntax Semantics and Structure in Statistical Translation, Oct. 25, 2014, pp. 103-111.

He et al., "Deep Residual Learning for Image Recognition," IEEE Conference 303 on Computer Vision and Pattern Recognition, 2015, pp. 1-9.

Hochreiter et al., "Long Short-Term Memory," Neural Computation, vol. 9, No. 8, 1997, pp. 1-32.

Karpathy et al., "Visualizing and Understanding Recurrent Networks," International Conference on Learning Representations Workshop, 2016, pp. 1-11.

Simonyan et al., "Very Deep Convolutional Networks for Large-Scale Image Recognition," International Conference on Learning Representations, 2015, pp. 1-14.

Tran et al., "C3D: Generic Features for Video Analysis," 2014, pp. 1-10 retrieved from https://arxiv.org/pdf/1412.0767v1.pdf.

Yang et al., "Multilayer and Multimodal Fusion of Deep Neural Networks for Video Classification," ACM MM '16, Oct. 2016, pp. 1-10.

* cited by examiner

TRANSFORMING CONVOLUTIONAL NEURAL NETWORKS FOR VISUAL SEQUENCE LEARNING

CLAIM OF PRIORITY

This application claims the benefit of U.S. Provisional Application No. 62/524,359 titled "FUSING RECURRENT AND CONVOLUTIONAL NEURAL NETWORKS FOR VISUAL SEQUENCE LEARNING," filed Jun. 23, 2017, the entire contents of which is incorporated herein by reference.

FIELD OF THE INVENTION

The present invention relates to visual sequence learning, and more particularly to visual sequence learning using neural networks.

BACKGROUND

Recurrent neural networks (RNNs) have achieved excellent performance on a variety of sequential learning problems including language modeling, handwriting recognition, machine translation, speech recognition, polyphonic music modeling, and intelligent video analytics. A vanilla recurrent neural network (VRNN) extends the conventional feedforward network to handle a variable-length sequence by accumulating the context of previous inputs in its internal state to influence proceeding outputs. While an abundance of work exists to understand and improve RNNs in the context of language and audio signals, relatively little attention has been paid to analyze or modify RNNs for visual sequences, which by nature have distinct properties.

In contrast to language and speech, the processing unit of a visual sequence is in a more structured format such as an image or a short video snippet. Therefore, convolutional neural networks (CNNs) usually serve as the backbone networks to extract semantic features, and RNNs are then built on top of a pre-trained CNN. A key advantage of the feature extraction for visual sequences is to exploit the extremely expressive CNN models that are pre-trained on large-scale image and video datasets. However, it remains an open question how to construct RNNs to better leverage the representational power and generalization ability of these pre-trained CNNs. In addition, visual sequences typically exhibit large redundancy and have diverse temporal dependencies on different applications. There is a need for addressing these issues and/or other issues associated with the prior art.

SUMMARY

A method, computer readable medium, and system are disclosed for visual sequence learning using neural networks. The method includes the steps of replacing a non-recurrent layer within a trained neural network model with a recurrent layer to produce a visual sequence learning neural network model and transforming feedforward weights for the non-recurrent layer into input-to-hidden weights of the recurrent layer to produce a transformed recurrent layer. The method also includes the steps of setting hidden-to-hidden weights of the recurrent layer to initial values and processing video image data by the visual sequence learning neural network model to generate classification or regression output data. In one embodiment, the trained neural network model is a convolutional neural network (CNN).

DETAILED DESCRIPTION

One or more non-recurrent layers of a pre-trained (i.e., trained) convolutional neural network model are each transformed into a recurrent layer to produce a neural network model for visual sequence learning. Feedforward weights of a trained non-recurrent layer of the pre-trained convolutional neural network model that is transformed into a recurrent layer are used as initial values for the input-to-hidden weights of the recurrent layer. During subsequent training, the input-to-hidden weights of the recurrent layer are fine-tuned and hidden-to-hidden weights that are initialized to untrained values are learned. In one embodiment, accuracy of the resulting neural network model is improved compared with using conventional techniques and number of parameters of the resulting neural network is reduced. The transformation technique may implement any recurrent structure and is relevant for many visual sequence learning applications, including, but not limited to sequential face alignment, dynamic hand gesture recognition, and action recognition.

Figure 1A:
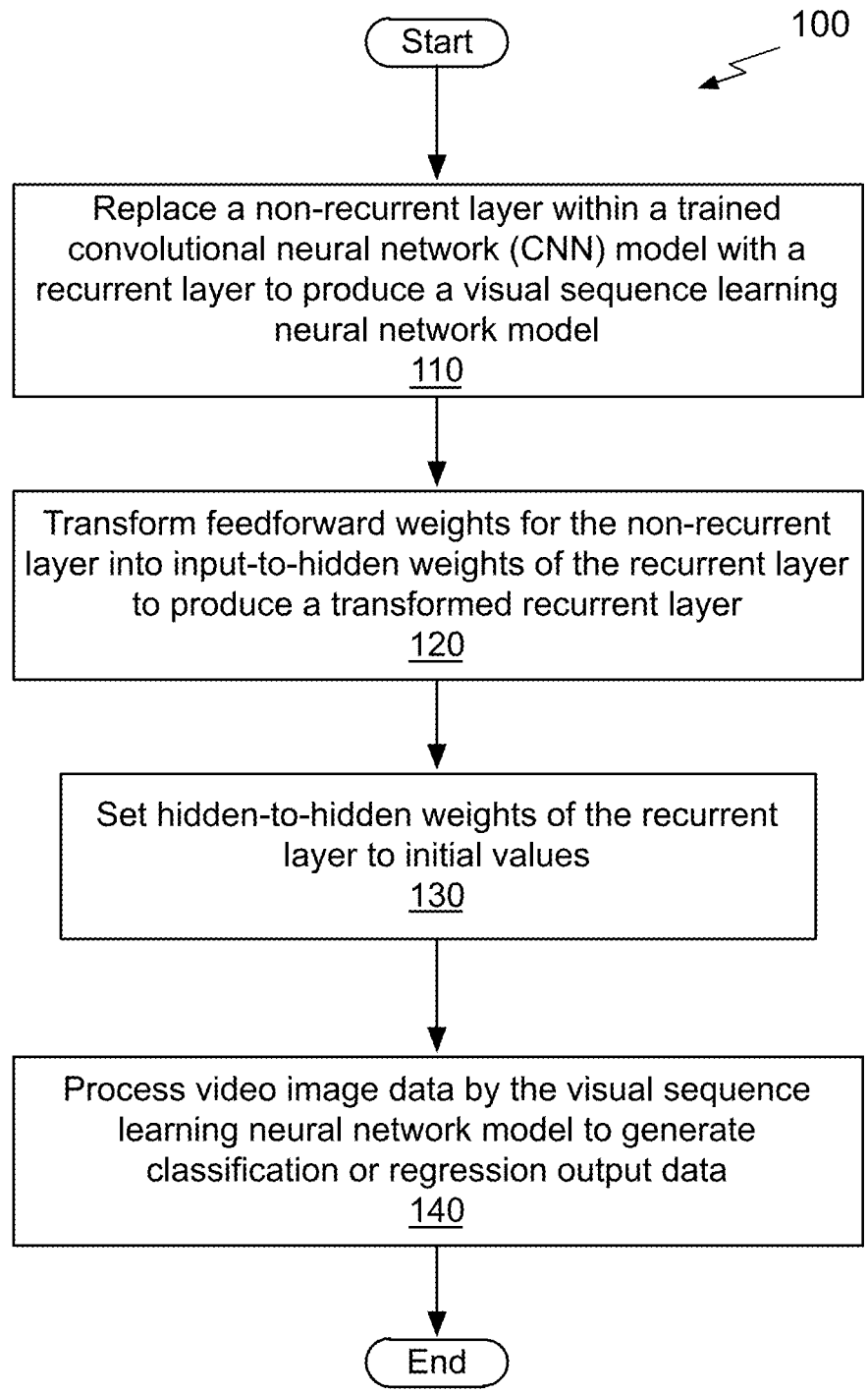
FIG. 1A illustrates a flowchart of a method for visual sequence learning using neural networks, in accordance with one embodiment.

FIG. 1A illustrates a flowchart of a method for classifying video image data using deep neural networks, in accordance with one embodiment. The method 100 is described in the context of a neural network model, and the method 100 may also be performed by a program, custom circuitry, or by a combination of custom circuitry and a program. For example, the method 100 may be executed by a GPU, CPU, or any processor capable of performing the necessary processing operations. Furthermore, persons of ordinary skill in the art will understand that any system that performs method 100 is within the scope and spirit of embodiments of the present invention.

At step 110, a non-recurrent layer within a trained convolutional neural network model is replaced with a recurrent layer to produce a visual sequence learning neural network model. In one embodiment, the trained convolutional neural network model is a two-dimensional (2D) CNN and the training video image data corresponds to a single image or a single video frame. In one embodiment, the trained convolutional neural network model is a three-dimensional (3D) CNN and the training video image data corresponds to a snippet, clip, or sequence of video frames.

In one embodiment, the transformed neural network model is configured to process training video image data of at least one modality such as spatial (color), depth, or optical flow. For example, neural network model may be trained to perform sequential face alignment using color data. The neural network model may be trained to perform hand gesture recognition using color and depth data. The neural network model may be trained to perform action recognition using color and flow data. Optical flow data may be computed from video image data. In one embodiment, the optical flow data is represented by three color channels, at least one layer is replaced with a recurrent layer. Optical flow explicitly captures dynamic motions and therefore provides clues to recognize actions and conveys rough shape cues of moving objects, e.g., the skier and ski poles in skiing videos.

After the convolutional neural network model is trained, one or more non-recurrent (e.g., fully connected and/or convolutional) layers of the trained convolutional neural network model may be transformed into respective recurrent layers. A selection criterion based on a distribution of activation values for each recurrent layer may be used to select the one or more non-recurrent layers to be transformed. In one embodiment, the non-recurrent layer(s) to be replaced with recurrent layers are selected based on a saturation characteristic, where activation values for neurons in a transformed recurrent layer are distributed between 0.0 and 1.0. The distribution of activation values is considered saturated when more activation values are distributed near the minimum and maximum activation values than near the center (the center is between 0.1 and 0.9).

At step 120, (pre-trained) feedforward weights for the non-recurrent layer are transformed into input-to-hidden weights of the recurrent layer to produce a transformed recurrent layer. In a conventional recurrent neural network system, a recurrent layer is typically added to a CNN after the last layer of the CNN and the parameters of the recurrent layer (input-to-hidden weights and hidden-to-hidden weights) are initialized to untrained values. In contrast with the conventional neural network system, the feedforward weights of a pre-trained non-recurrent layer of the convolutional neural network model that is transformed into a recurrent layer are used as initial values for the input-to-hidden weights of the recurrent layer.

In one embodiment, for recurrent layers such as a long short term memory (LSTM) or gated recurrent unit (GRU), values for the multiple input-to-hidden states corresponding to multiple gating functions may be initialized to individual values based on the feedforward weights. Alternatively, values of all of the multiple input-to-hidden states may be initialized to uniform values using the feedforward weights. Sharing the uniform values for multiple gating functions reduces the number of recurrent parameters that are maintained (i.e., stored and updated).

At step 130, hidden-to-hidden weights of the recurrent layer are set to initial values. In one embodiment, initial values for the hidden-to-hidden weights are random values.

At step 140, video image data is processed by the visual sequence learning neural network model to generate classification or regression output data. In the context of the following description, classification output data (i.e., predictions) are class labels generated by the neural network model for at least one image of video input data. In one embodiment, the regression output data is the two-dimensional locations of facial landmarks in the sequential face alignment application. In one embodiment, a class label is a class-conditional probability vector associated with the training video image data. During training, classification accuracy data is computed by comparing the classification output data with a target classification output (provided in a training dataset) and adjusting the weights to reduce differences between the classification output data with a target classification output.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

RNNs have been well studied for decades in sequence learning, for language modeling, machine translation, and speech recognition. A vanilla RNN (VRNN) contains a recurrent or self-connected hidden state h, whose activation depends on that of the previous time step:

$$h_t = \mathcal{H}(W_{ih}y_t + W_{hh}h_{t-1}), \quad (1)$$

where $\mathcal{H}$ is an activation function, $W_{ih}$ is the input-to-hidden matrix, $W_{hh}$ is the hidden-to-hidden matrix, $y_t$ is the input to the recurrent layer. A bias vector (not shown) may also be included. In order to enhance the capability to use contextual information, significant efforts have been made to mitigate the gradient vanishing problem for VRNN. Among the most successful variants are LSTM and GRU, which incorporate gating functions into the state dynamics. At each time step, LSTM maintains a memory cell $c_t$ and a hidden state $h_t$ that are carefully regulated by gates:

$$i_t = \text{sig } m(W_{ii}y_t + W_{hi}h_{t-1}),$$

$$f_t = \text{sig } m(W_{if}y_t + W_{hf}h_{t-1}),$$

$$o_t = \text{sig } m(W_{io}y_t + W_{ho}h_{t-1}),$$

$$\tilde{c}_t = \tan h(W_{ic}y_t + W_{hc}h_{t-1}),$$

$$c_t = f_t \odot c_{t-1} + i_t \odot \tilde{c}_t,$$

$$h_t = o_t \odot \tan h(c_t). \quad (2)$$

Similar to equation (1), $W_{i\cdot}$ are the input-to-hidden matrices and $W_{h\cdot}$ are the hidden-to-hidden matrices. Here $i_t$, $f_t$, and $o_t$ are the input, forget and output gates, respectively. $\tilde{c}_t$ is the new memory state, and $\odot$ is the element-wise product. GRU simplifies LSTM primarily by merging the hidden state and memory cell and combining the forget and input gates into a single update gate:

$$r_t = \text{sig } m(W_{ir}y_t + W_{hr}h_{t-1}),$$

$$z_t = \text{sig } m(W_{iz}y_t + W_{hz}h_{t-1}),$$

$$\tilde{h}_t = \tan h(W_{ih}y_t + W_{hh}(r_t \odot h_{t-1})),$$

$$h_t = (1-z_t) \odot h_{t-1} + z_t \odot \tilde{h}_t, \quad (3)$$

where $r_t$ and $z_t$ are the reset and update gates, and $\tilde{h}_t$ is the candidate hidden state. Note that for the above three basic recurrent structures in Equations (1), (2), and (3), multiple recurrent layers can be stacked on top of each other to perform deep and hierarchical recurrent processing.

Conventionally, RNNs are attached following the last layer of pre-trained CNNs for visual sequence learning tasks, to harness the strong representational ability of the pre-trained CNN models and capture the long-term temporal contexts. In contrast with conventional techniques, a more effective and generalized approach is described that directly converts one or more layers of the pre-trained CNNs into recurrent layer(s).

A Neural Network Architecture for Visual Sequence Learning

RNNs coupled with pre-trained CNNs are powerful tools to exploit the important temporal connections in visual sequence learning tasks. CNN models, pre-trained on large-scale image or video datasets, retain strong semantic and generality properties. When one or more recurrent layers are added following a pre-trained CNN, as in done conventionally, the recurrent layers must be trained from scratch, even though a pre-trained CNN is used for feature extraction. In contrast with conventional techniques, a pre-trained layer of a neural network model is directly transformed into a recurrent layer in order to maximize the representational power and generalizing capacity of pre-trained convolutional neural networks. In one embodiment, one or more layers that are transformed are pre-trained convolutional layers or fully connected layers. The difficulty of training one or more RNNs is mitigated, because components of a pre-trained convolutional neural network model are used as a partially pre-trained RNN. Therefore, the generalization ability of a pre-trained convolutional neural network is inherited by the RNN, improving the overall performance.

Figure 1B:
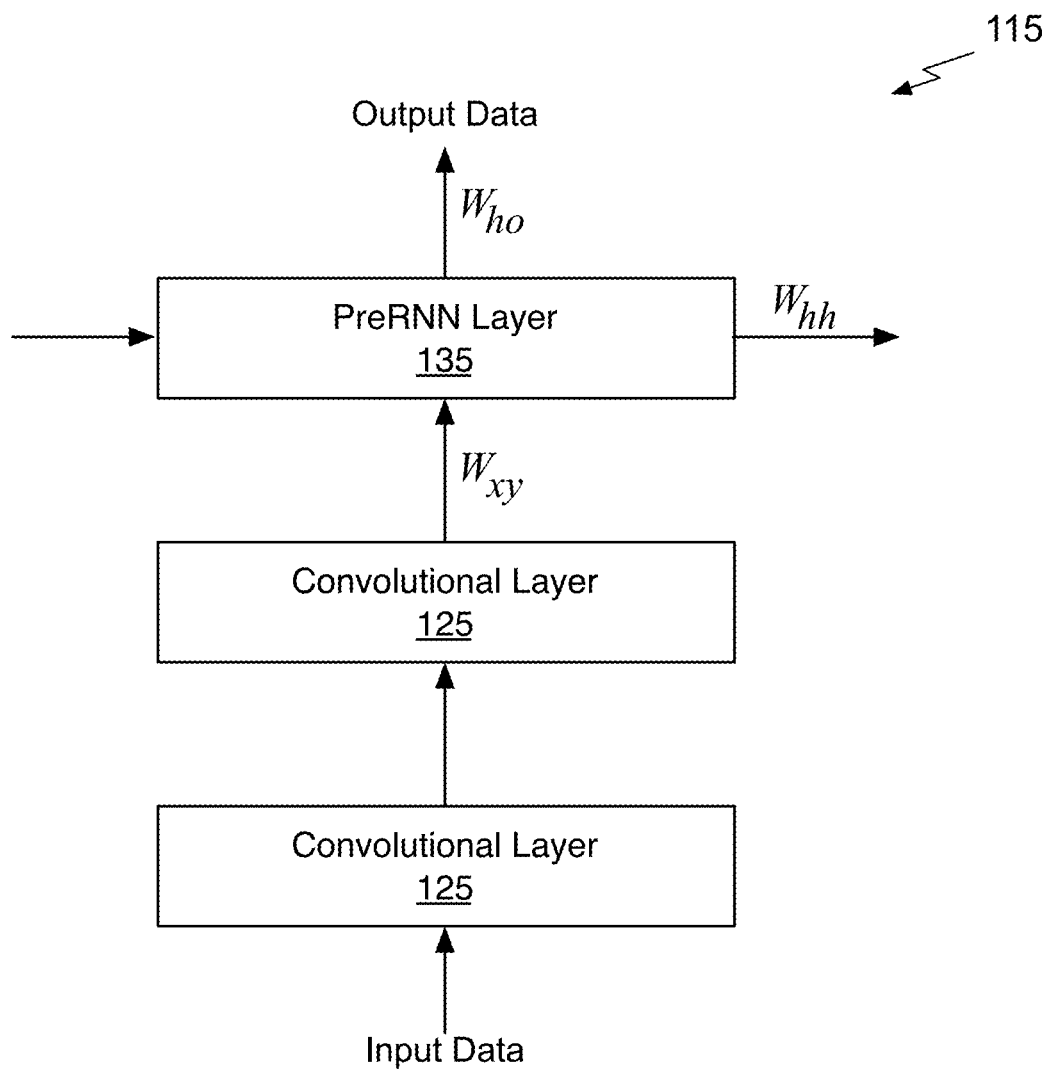
FIG. 1B illustrates a block diagram of a system for visual sequence learning, in accordance with one embodiment.

FIG. 1B illustrates a block diagram of a visual sequence learning neural network model 115, in accordance with one embodiment. The visual sequence learning neural network model 115 includes two convolutional layers 125 and a PreRNN layer 135. The PreRNN layer 135 is a recurrent layer that replaced a non-recurrent layer. A first convolutional layer 125 receives input data and the PreRNN layer 135 that replaced a last convolutional layer 125 generates output data. Input video image data may be presented in the form of single frames to the visual sequence learning neural network model 115.

The $W_{xy}$ weights that are associated with the PreRNN layer 135 are pre-trained weights (i.e., weights of the pre-trained non-recurrently layer). The $W_{hh}$ and $W_{ho}$ weights are randomly initialized weights introduced by the PreRNN layer 135. Other embodiments of the visual sequence learning neural network model 115 may include fewer or more convolutional layers 125. Although only a single PreRNN layer 135 is shown in FIG. 1B, more than one convolutional layer 125 may be replaced with a PreRNN layer 135.

Figure 1C:
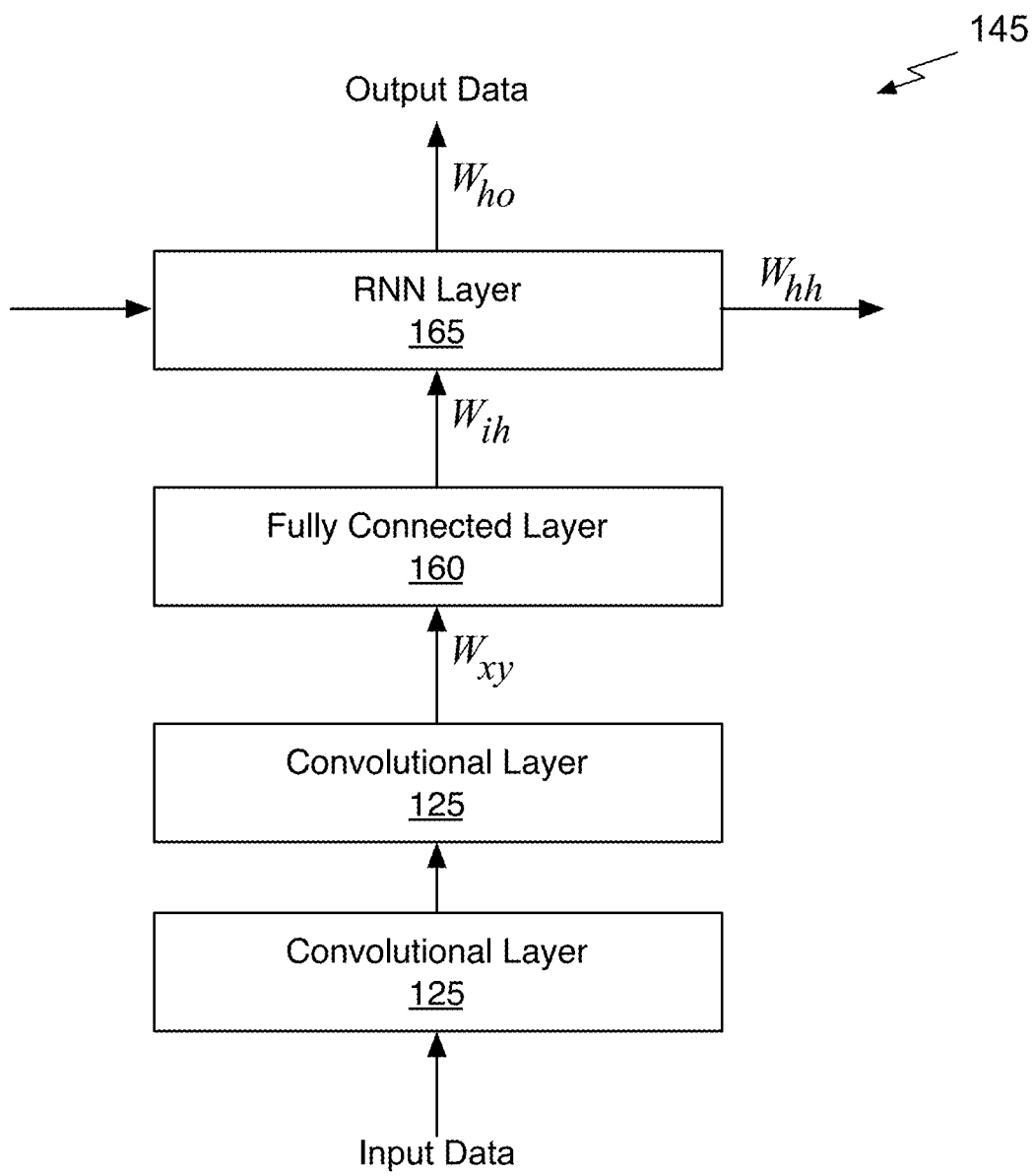
FIG. 1C illustrates a block diagram of a prior art system for visual sequence learning.

FIG. 1C illustrates a block diagram of a prior art system 145 for visual sequence learning. The prior art system 145 includes two convolutional layers 125, a fully connected layer 160, and a RNN layer 165. A first convolutional layer 125 receives input data and the RNN layer 165 generates output data. In accordance with different backbone CNN architectures, the RNN layer 165 is stacked on top of the last layer 160 of the pre-trained convolutional neural network including the convolutional layers 125 and the fully connected layer 160.

The $W_{xy}$ weights that are associated with the fully connected layer 160 are pre-trained weights. However, the $W_{ih}$ weights associated with the RNN layer 165 are not pre-trained. The $W_{hh}$ and $W_{ho}$ weights are randomly initialized weights introduced by the RNN layer 165. In contrast with the visual sequence learning neural network model 115, where the weights associated with the PreRNN layer 135 are pre-trained, the weights associated with the RNN layer 165 of the prior art system 145 are not pre-trained.

Figure 1D:
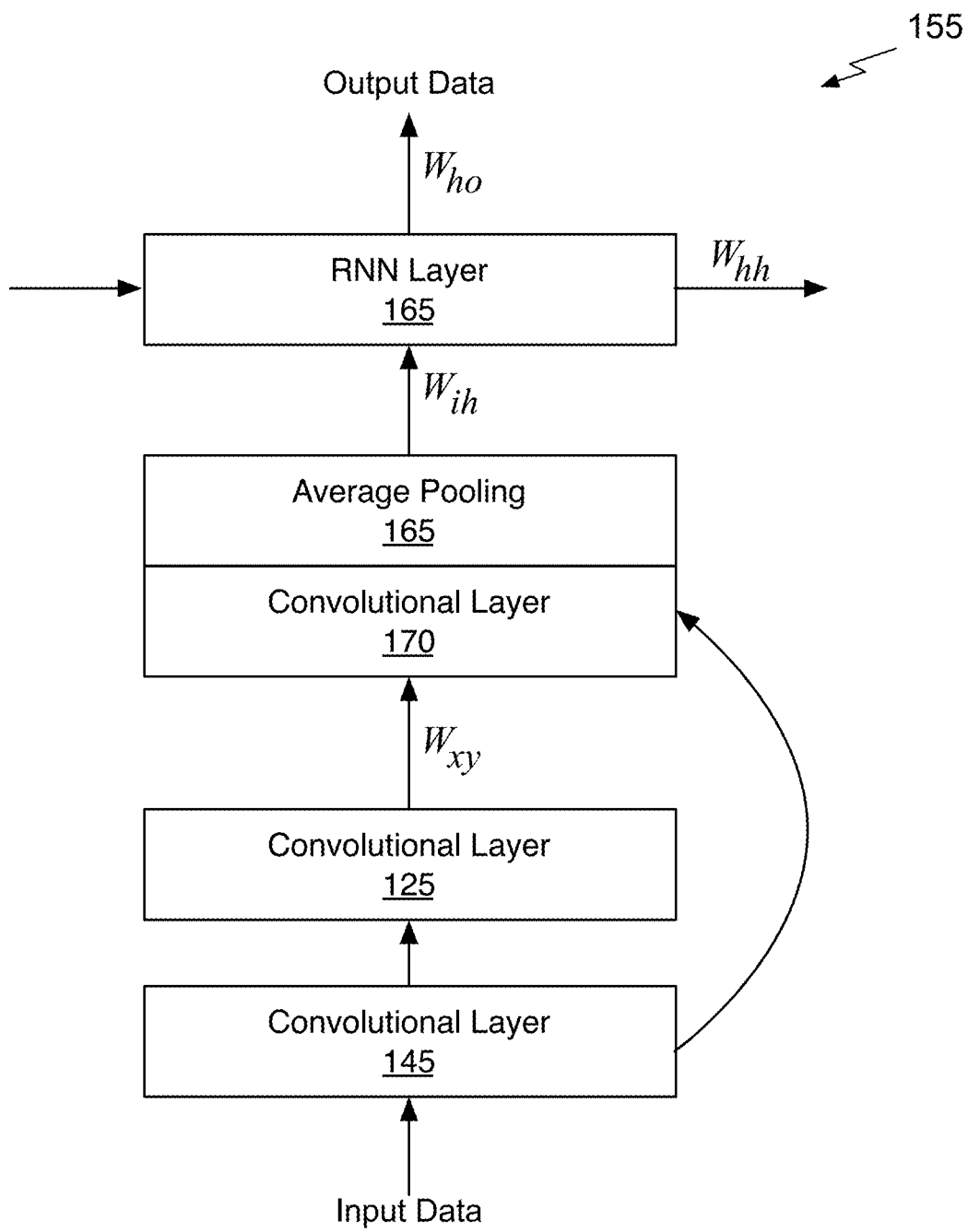
FIG. 1D illustrates another block diagram of a prior art system for visual sequence learning.

FIG. 1D illustrates a block diagram of another prior art system 155 for visual sequence learning. The prior art system 155 includes a convolutional layer 145, a convolutional layer 125, a convolutional layer 170, an average pooling layer 165, and a RNN layer 165. The first convolutional layer 145 receives input data and the RNN layer 165 generates output data. The RNN layer 165 is stacked on top of the average pooling layer 165 of the pre-trained convolutional neural network including the convolutional layer 145, the convolutional layer 125, the convolutional layer 170, and the average pooling layer 165. Compared with the prior art system 145, the prior art system 155 includes a residual (or skip) connection from the convolutional layer 145 to the convolutional layer 170.

The $W_{xy}$ weights that associated with the convolutional layer 170 are pre-trained weights. However, the $W_{ih}$ weights associated with the RNN layer 165 are not pre-trained. The $W_{hh}$ and $W_{ho}$ weights are randomly initialized weights introduced by the RNN layer 165. In contrast with the visual sequence learning neural network model 115, where the weights associated with the PreRNN layer 135 are pre-trained, the weights associated with the RNN layer 165 of the prior art system 155 are not pre-trained.

Figure 1E:
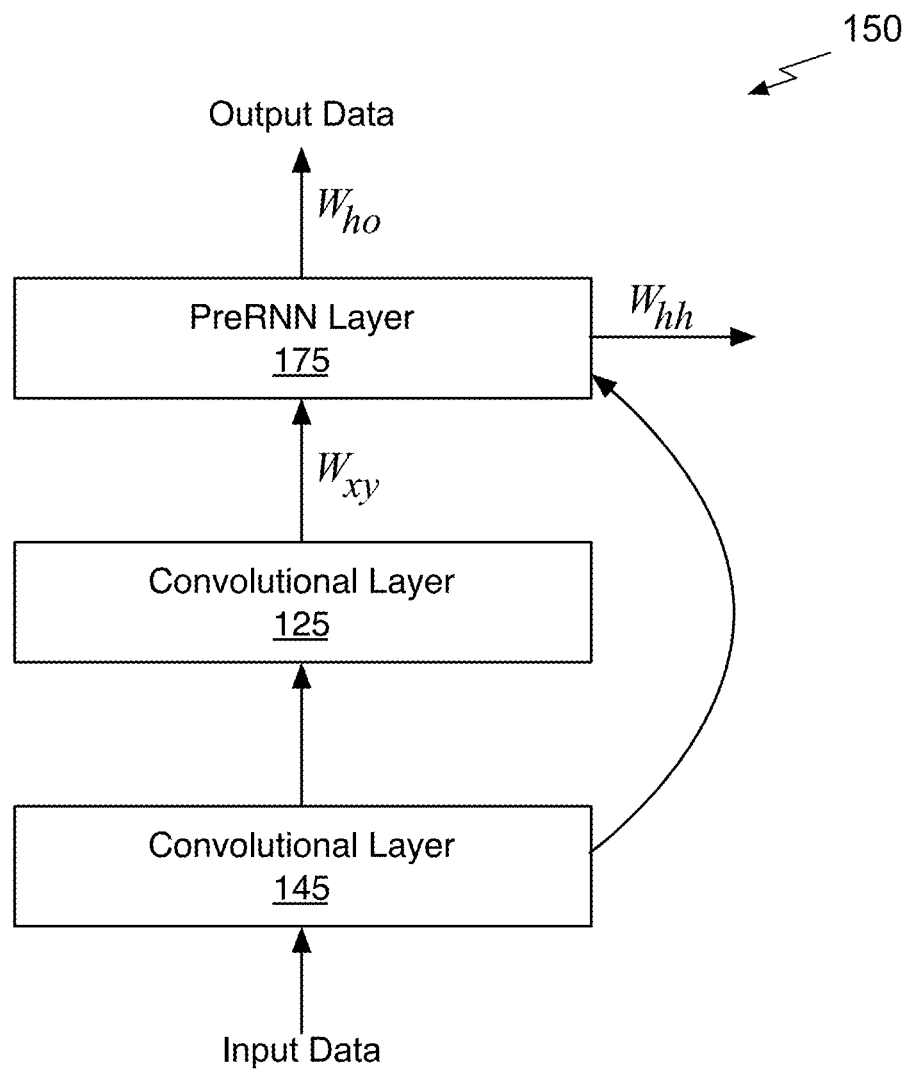
FIG. 1E illustrates another block diagram of a video sequence learning system, in accordance with one embodiment.

FIG. 1E illustrates another block diagram of a visual sequence learning neural network model 150, in accordance with one embodiment. The visual sequence learning neural network model 150 includes a convolutional layer 145, a convolutional layer 125, and a PreRNN layer 175. The PreRNN layer 175 is a recurrent layer that replaced a non-recurrent layer. A first convolutional layer 125 receives input data and the PreRNN layer 135 generates output data. In one embodiment, the PreRNN layer 135 replaces a last convolutional layer 170 and an averaged pooling layer 165. Compared with the visual sequence learning neural network model 115, the visual sequence learning neural network model 150 includes a residual (or skip) connection from the convolutional layer 145 to the PreRNN layer 175.

The $W_{xy}$ weights that associated with the PreRNN layer 165 are pre-trained weights (i.e., weights of the pre-trained non-recurrently layer). The pre-trained $W_{xy}$ weights are used in place of the input-to-hidden weight inputs to the PreRNN layer 165. The $W_{hh}$ and $W_{ho}$ weights are randomly initialized weights introduced by the PreRNN layer 135. Other embodiments of the visual sequence learning neural network model 115 may include fewer or more convolutional layers 125. Although only a single PreRNN layer 135 is shown in FIG. 1E, more than one convolutional layer 145, 125, and/or 170 may be replaced with a PreRNN layer 135.

Replacing one or more layers of a pre-trained convolutional neural network model with PreRNN layer(s) 135 or 175 is a generic approach that can be applied to various architectures of pre-trained 2D and 3D neural networks, particularly CNNs. As illustrated FIGS. 1B and 1E, a layer of CNNs such as VGG and C3D with fully connected layers at the end of the convolutional networks can be replaced with a PreRNN layer 135 or 175. Similarly, a layer of CNNs such as ResNet and DenseNet with convolutional and global average pooling layers at the end, as depicted in FIG. 1D can also be replaced with a PreRNN layer 135 or 175 to produce the visual sequence learning neural network model 150. Replacing a pre-trained non-recurrent layer with a PreRNN layer 135 or 175 is also able to adapt to all three basic recurrent structures including VRNN, LSTM and GRU. Additionally, an alternative, PreRNN-SIH can be used to simplify gating functions and reduce recurrent parameters. A benefit of replacing a pre-trained non-recurrent layer with a PreRNN layer 135 or 175 is that accuracy may be improved and training of the weights for the non-recurrent layer is leveraged. Any PreRNN layer 135 or 175 may use the PreRNN-SIH gating function technique.

The last fully connected layer or convolutional layer of a pre-trained CNN is assumed to have the structure:

$$y = \mathcal{H}(W_{xy} \circ x), \quad (4)$$

where $\mathcal{H}$ is an activation function, $W_{xy}$ are the pre-trained feedforward weights, x and y are the input and output of the layer, and o indicates matrix multiplication for the fully connected layer or a convolution operation for the convolutional layer. In order to take advantage of the pre-trained non-recurrent layer, the feedforward layer is reformulated as a PreRNN layer 135 or 175 using the pre-trained feedforward weights as the input-to-hidden weights for the PreRNN layer 135 or 175. The fully connected layer (such as the fully connected layer 160) may be replaced by the PreRNN layer 135 through:

$$y_t = \mathcal{H}(W_{xy}x_t + W_{hh}y_{t-1}), \quad (5)$$

where $x_t$ and $y_t$ are reformed to be the input and hidden state of the recurrent layer at time t. The convolutional layer (such as the convolutional layer 125) may be transformed into the PreRNN layer 135 or 175 by:

$$y_t = \mathcal{H}(\mathcal{H}(\mathcal{B}(W_{xy}*x_t) + \gamma_t) + W_{hh}y_{t-1}), \quad (6)$$

where * is the convolution operation, $\mathcal{B}$ represents the batch normalization with the pre-computed mini-batch statistics, $\gamma_t$ indicates an optional residual (or skip) connection in residual networks, and $\mathcal{H}$ is the global average pooling.

Replacing a non-recurrent layer with a PreRNN layer essentially transforms the feedforward weights $W_{xy}$ and output y in Equation (4) as the input-to-hidden weights $W_{xy}$ and hidden state $y_t$ in Equations (5) and (6). In comparison to Equation (1) for the traditional VRNN, which includes two randomly initialized weight matrices (input-to-hidden weight matrix $W_{ih}$ and hidden-to-hidden weight matrix $W_{hh}$), the PreRNN in Equations (5) and (6) only brings in a single hidden-to-hidden weight matrix $W_{hh}$ to be trained from scratch, while the input-to-hidden weights $W_{xy}$ inherited from Equation (4) have been pre-trained and can be just fine-tuned with additional training. As a result, the neural network model including the PreRNN 135 or 175 can fully make use of the robust generalization of a pre-trained neural network model and preserve the architecture to the greatest extent.

Figure 1F:
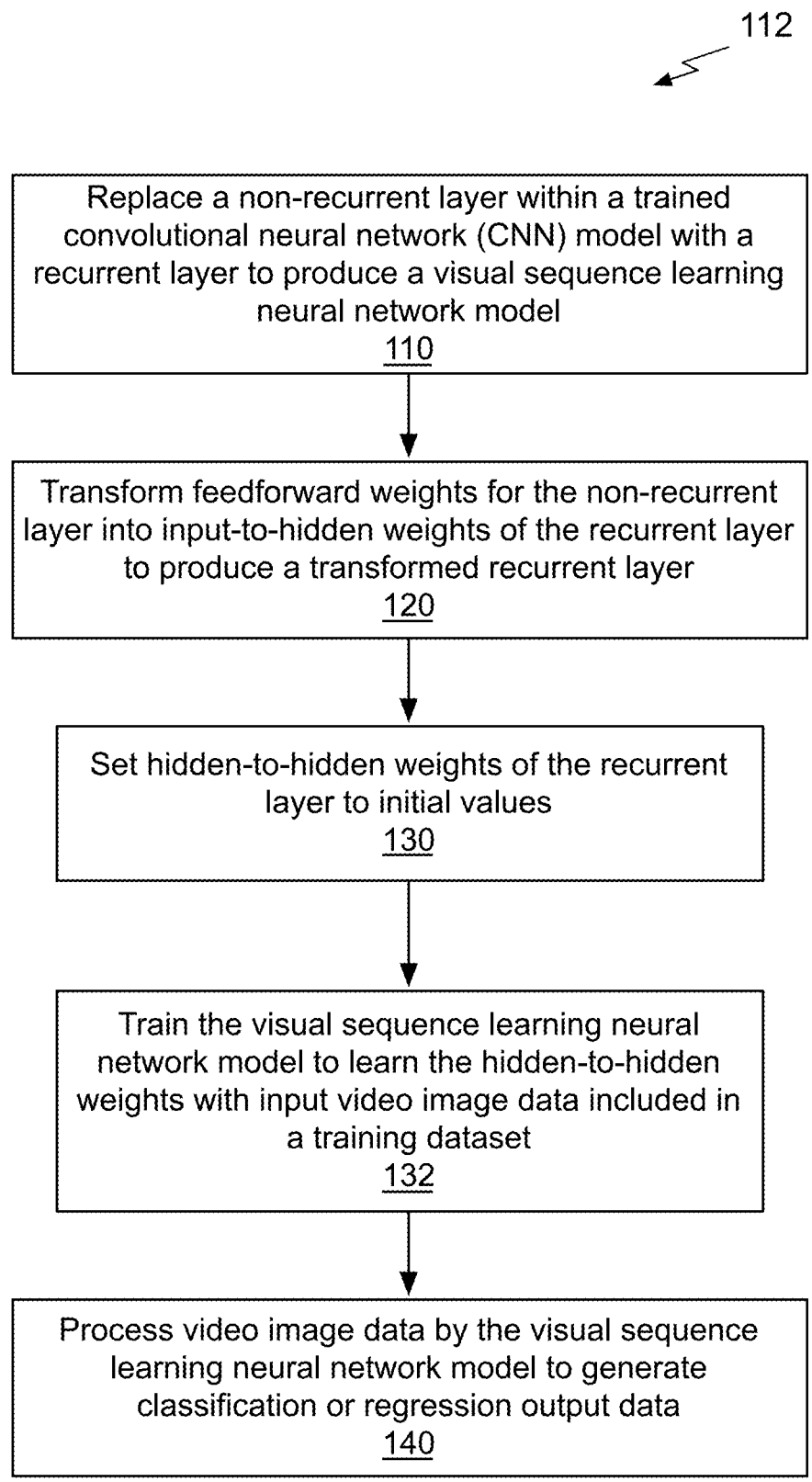
FIG. 1F illustrates another flowchart of a method for visual sequence learning using neural networks, in accordance with one embodiment.

FIG. 1F illustrates another flowchart of a method for classifying video image data using deep neural networks, in accordance with one embodiment. The method 112 is described in the context of a neural network model, and the method 112 may also be performed by a program, custom circuitry, or by a combination of custom circuitry and a program. For example, the method 112 may be executed by a GPU, CPU, or any processor capable of performing the necessary processing operations. Furthermore, persons of ordinary skill in the art will understand that any system that performs method 112 is within the scope and spirit of embodiments of the present invention.

Steps 110, 120, and 130, are completed as previously described in conjunction with FIG. 1A. At step 132, the visual sequence learning neural network model is trained to learn the hidden-to-hidden weights input to the PreRNN layer 135 or 175. In one embodiment, input video image data included in a training dataset by the visual sequence learning neural network model 115 or 150 to generate output data. The output data is compared to target output data included in the training dataset to produce comparison results and the hidden-to-hidden weights are adjusted based on the comparison results. During training, the input-to-hidden weights input to the PreRNN layer 135 or 175 are also adjusted (i.e., fine-tuned) to reduce differences between the output data and the target output data. In one embodiment, the training data set is configured for sequential face alignment and the video image data is color data. Sequential face alignment is fundamental to many applications such as face recognition, expression analysis, facial animation capturing, etc. In one embodiment, the training dataset is configured for dynamic hand gesture recognition and the video image data is color data and depth data. In one embodiment, the training dataset is configured for action recognition and the video image data is color data and optical flow data.

In comparison with the VRNN, a prominent feature shared by LSTM and GRU is the additive nature in updating the hidden state from t to t+1, i.e., keep the existing state and add changes on top of the existing state through the use of gating functions. Incrementally updating the hidden state helps each hidden state unit to remember the existence of a specific feature for a long series of steps, and more importantly, to create shortcut paths to allow the error to be back-propagated easily through multiple steps without vanishing too quickly. The gating functions of LSTM and GRU may also be accommodated when a non-recurrent layer is replaced with a PreRNN layer 135 or 175. Each gating function may be split into two components and the pre-trained feedforward (non-recurrent) layer may be fused into the components.

Gate-Dependent Input-to-Hidden State Transformation

A pre-trained feedforward layer of a CNN may be converted into a recurrent layer for LSTM or GRU, in a similar manner as for a VRNN. In Equations (2) and (3) each gate is composed of two components, namely, the input-to-hidden state and the hidden-to-hidden state. For notational simplicity, LSTM's new memory state is called $\tilde{c}_t$ and GRU's candidate hidden state $\tilde{h}_t$ a gate. The gate-dependent input-to-hidden state for the PreRNN layer is defined as:

$$u_t(g) = \begin{cases} W_{ig}^p x_t & \text{a fully connected layer,} \\ \mathcal{P}(\mathcal{B}(W_{ig}^p * x_t) + \gamma_t) & \text{a convolutional layer,} \end{cases} \quad (7)$$

where g is a gate index, g={i, f, o, c} for LSTM and g={r, z, h} for GRU, $u_t(g)$ is the input-to-hidden state of gate g at time t and $W_{ig}^p$ is the pre-trained input-to-hidden weights of gate g. The feedforward weights $W_{ig}^p$ may be used to compute gate-specific values (e.g., $u_t(i)$, $u_t(f)$, $u_t(o)$, and $u_t(c)$ for LSTM or $u_t(r)$, $u_t(z)$, and $u_t(h)$f or GRU) for multiple input-to-hidden states corresponding to multiple gating functions of the PreRNN layer 135 or 175.

Concretely, the pre-trained feedforward weights $W_{xy}$ in Equation (4) are converted into the input-to-hidden weights for one gate and the pre-trained values are used to initialize the input-to-hidden weights for other gates. Therefore, the gating functions of LSTM in Equation (2) may be redefined as:

$$i_t = \text{sig } m(u_t(i) + W_{hi} h_{t-1}),$$

$$f_t = \text{sig } m(u_t(f) + W_{hf} h_{t-1}),$$

$$o_t = \text{sig } m(u_t(o) + W_{ho} h_{t-1}),$$

$$\tilde{c}_t = \tan h(u_t(c) + W_{hc} h_{t-1}), \tag{8}$$

where only the hidden-to-hidden weights $W_{h.}$ are randomly initialized, and the same updating functions in Equation (2) are followed to renew the memory cell $c_t$ and hidden state $h_t$. Equations (7) and (8) may be used to transform the feedforward weights into the input-to-hidden weights of the PreRNN 135 or 175 during step 120 of the method 100 or 112 when the visual sequence learning neural network model 115 or 150, respectively, is an LSTM.

Correspondingly, the gating functions of GRU in Equation (3) can be redefined as:

$$r_t = \text{sig } m(u_t(r) + W_{hr} h_{t-1}),$$

$$z_t = \text{sig } m(u_t(z) + W_{hz} h_{t-1}),$$

$$\tilde{h}_t = \tan h(u_t(h) + W_{hh}(r_t \odot h_{t-1})), \tag{9}$$

and the hidden state $h_t$ is updated in the same manner as in Equation (3). By fusing the pre-trained feedforward layer into the input-to-hidden state of each gate, a PreRNN layer introduces fewer input-to-hidden parameters and only the hidden-to-hidden weights need to be trained from scratch. Equations (7) and (9) may be used to transform the feedforward weights into the input-to-hidden weights of the PreRNN 135 or 175 during step 120 of the method 100 or 112 when the visual sequence learning neural network model 115 or 150, respectively, is an GRU.

Single Input-to-Hidden State Transformation (PreRNN-SIH)

In the aforementioned transformation scheme, each gate learns gate-specific input-to-hidden weights $W_{ig}^p$, though each gate starts from the same initial state $W_{xy}$. In order to simplify the gating functions and fully utilize the pre-trained feedforward layer, all gates may be bound to the same input-to-hidden state:

$$v_t = \begin{cases} W_{xy} x_t & \text{a fully connected layer,} \\ \mathcal{P}(\mathcal{B}(W_{xy} * x_t) + \gamma_t & \text{a convolutional layer,} \end{cases} \tag{10}$$

where $v_t$ is the single input-to-hidden (SIH) state that are adopted by all the gates for the PreRNN layer 135 or 175. Compared to the gate-dependent input-to-hidden state in Equation. (7), the SIH technique directly converts the pre-trained feedforward layer to be the unified input-to-hidden state for all the gates. Therefore, the gating functions of LSTM in Equation (2) are changed to:

$$i_t = \text{sig } m(v_t + W_{hi} h_{t-1}),$$

$$f_t = \text{sig } m(v_t + W_{hf} h_{t-1}),$$

$$o_t = \text{sig } m(v_t + W_{ho} h_{t-1})$$

$$\tilde{c}_t = \tan h(v_t + W_{hc} h_{t-1}), \tag{11}$$

where all the gates are computed based on the same input-to-hidden state $v_t$. In the same way, the gating functions of GRU in Equation (3) are reformulated as:

$$r_t = \text{sig } m(v_t + W_{hr} h_{t-1}),$$

$$z_t = \text{sig } m(v_t + W_{hz} h_{t-1}),$$

$$\tilde{h}_t = \tan h(v_t + W_{hh}(r_t \odot h_{t-1})), \tag{12}$$

Hence, PreRNN-SIH in Equations (11) and (12) only introduces the hidden-to-hidden weights $W_{h.}$ that need to be trained from scratch. In addition, because the pre-trained feedforward layer is set to be the joint input-to-hidden state for all the gating functions of LSTM and GRU, the number of recurrent parameters for the PreRNN layer 135 or 175 is reduced, and consequently the computational cost is also reduced compared with computing gate-specific input-to-hidden states (e.g., $u_t(i)$, $u_t(f)$, $u_t(o)$, and $u_t(c)$, or $u_t(r)$, $u_t(z)$, and $u_t(h)$). In sum, when a non-recurrent layer is transformed into a PreRNN layer 135 or 175 using SIH, the feedforward weights $W_{xy}$ may be used to compute values for a unified input-to-hidden state corresponding to multiple gating functions of the PreRNN layer 135 or 175.

As previously described, one or more non-recurrent layers may be selected to be replaced by PreRNN layer(s) 135 or 175. In one embodiment, distributions of gate activations are used to select the one or more non-recurrent layers of a trained neural network model. A gate unit may be defined as left or right saturated if the gate activations are less than 0.1 or more than 0.9, otherwise, the gate unit is defined as unsaturated.

Figure 2A:
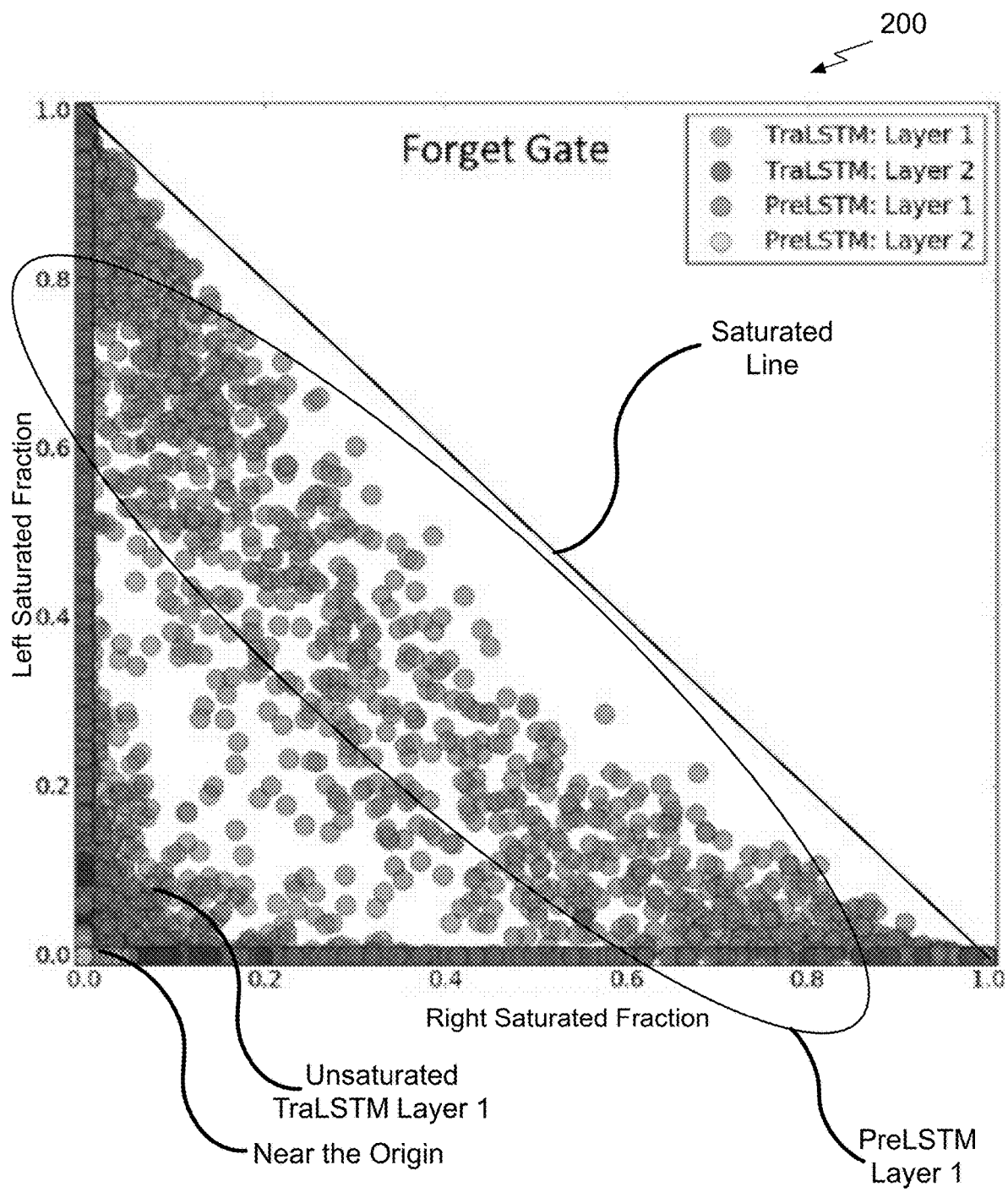
FIG. 2A illustrates a saturation plot of the fraction of times that a forget gate unit is left or right saturated, in accordance with one embodiment.

FIG. 2A illustrates a saturation plot 200 of the fraction of times that a forget gate unit is left or right saturated, in accordance with one embodiment. A first layer of an LSTM is constructed by a PreRNN layer 135 or 175 to produce a first layer of the visual sequence learning neural network model 115 or 150. Separately, a second layer of the LSTM is constructed by a PreRNN layer 135 or 175 to produce a second layer of the visual sequence learning neural network model 115 or 150. The graph illustrates the distribution of activation values for forget gate neurons for the first PreRNN layer (PreLSTM Layer 1) and for the second PreRNN layer (PreLSTM Layer 2) individually. The graph also illustrates the distribution of activation values for forget gate neurons each of a first layer and a second layer of or a traditional LSTM (TraLSTM).

The activations in the first layer of PreLSTM (PreLSTM Layer 1) lie in the more saturated region (i.e., closer to the saturation line) compared with the activations of either the first or the second layer of the TraLSTM. The implication of the distribution of the first layer is that PreLSTM is more capable to utilize the temporal context, e.g., the multiple frequently right saturated forget gate units (bottom right of the forget gate saturation plot 200) correspond to the memory cells that remember their values for long durations. Conversely, the activations of TraLSTM, particularly the TraLSTM Layer 1, are dispersed in the more unsaturated region of the saturation plot 200, indicating that the integrated temporal information decays rapidly.

Note that the activations in the second layer of both TraLSTM and PreLSTM concentrate near the origin in the saturation plot 200, where the gate units are rarely left or right saturated. It is likely that the second recurrent layer (PreLSTM Layer 2) virtually functions in a feedforward fashion and the preceding hidden state is barely used. Based on the saturation plot 200, the first layer of the LSTM should be selected to be constructed with a PreRNN layer 135 or 175. Specifically, a distribution of activation values for neurons in the transformed first layer is left and right saturated indicating that the first layer benefits by being constructed with a PreRNN layer 135 or 175.

In contrast, because the distribution of activation values for neurons in the transformed second layer are neither right nor left saturated for the second layer, the second layer of the LSTM should not be selected to be constructed by a PreRNN layer 135 or 175. Therefore, for the visual sequence learning neural network model 115 or 150, the first non-recurrent layer of the LSTM is built by a PreRNN layer 135 or 175 and the second non-recurrent layer of the LSTM is not transformed. In one embodiment, fewer activation values for the neurons in the PreRNN layer 135 or 175 are distributed between 0.1 and 0.9 than are distributed outside of 0.1 and 0.9 within a range 0.0 to 1.0. When the activation values for a PreRNN layer are not saturated, the PreRNN layer 135 or 175 may revert back to the non-recurrent layer, so that the non-recurrent layer is not replaced to produce the visual sequence learning neural network model 115 or 150. The gating mechanism may be inferred through saturation plots for LSTM or by activation histograms for GRU.

Figure 2B:
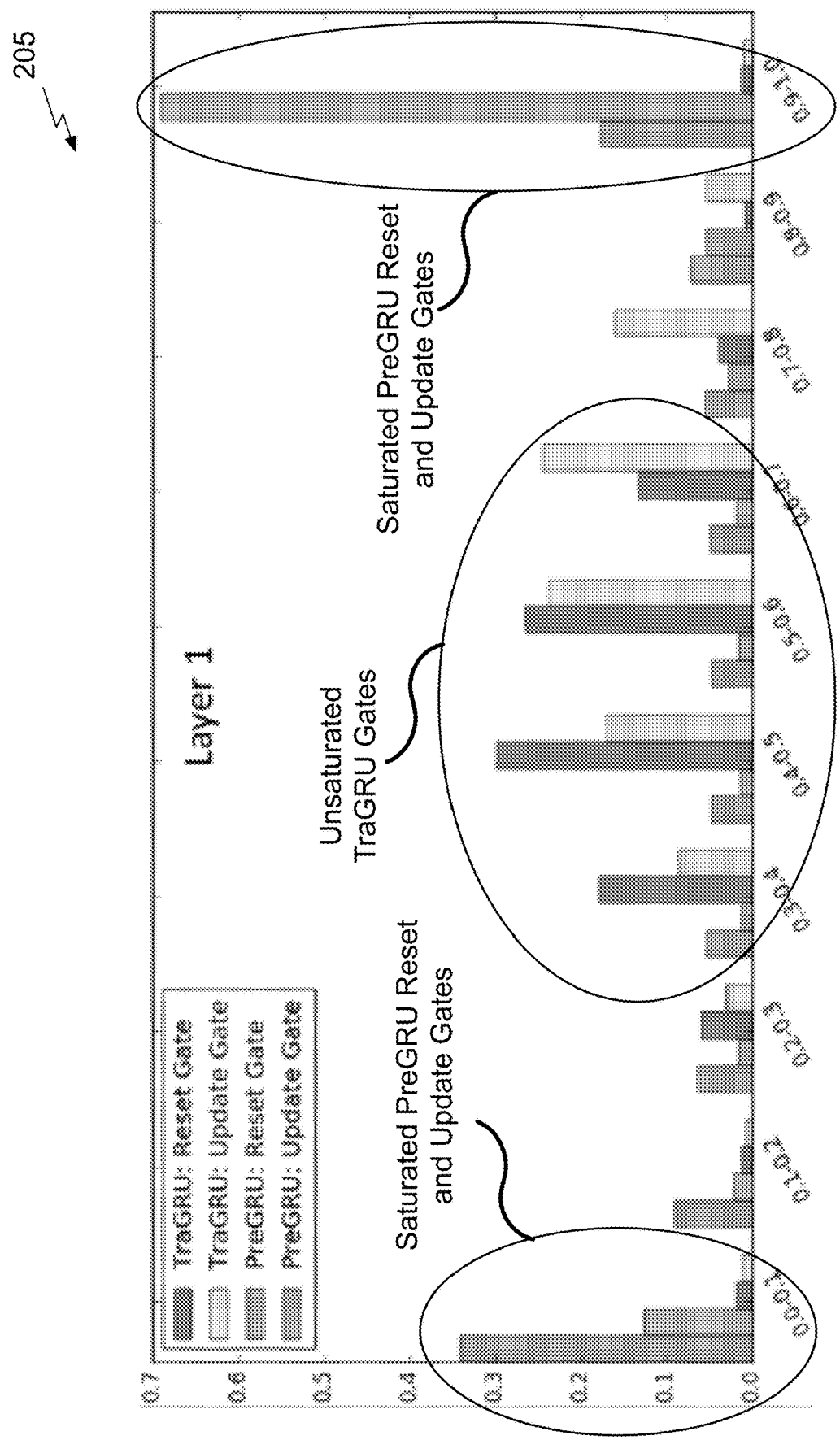
FIG. 2B illustrates an activation histogram over 10 bins for a first layer, in accordance with one embodiment.

FIG. 2B illustrates an activation histogram 205 over 10 bins for a first layer, in accordance with one embodiment. A first layer of a GRU is constructed by a PreRNN layer 135 or 175 to produce a first layer of a visual sequence learning neural network model 115 or 150. The bar graph illustrates the activation histogram for reset and update gate neurons for the first PreRNN layer (PreGRU reset gate and update gate). The bar graph also illustrates the activation histogram for reset and update gate neurons for a first layer of a traditional GRU (TraGRU reset gate and update gate).

For the first layer of PreGRU the left saturated (0.0-0.1) and right saturated (0.9-1.0) bins dominate the distribution of both the reset gate and update gate, whereas the activations of TraGRU gates gather in the unsaturated bins in the center of the distribution. Based on the saturation plot 205, the first layer of the GRU should be selected to be constructed by a PreRNN layer 135 or 175. Specifically, a distribution of activation values for neurons in the transformed first layer is left and right saturated indicating that the first layer benefits by being constructed by a PreRNN layer 135 or 175.

Figure 2C:
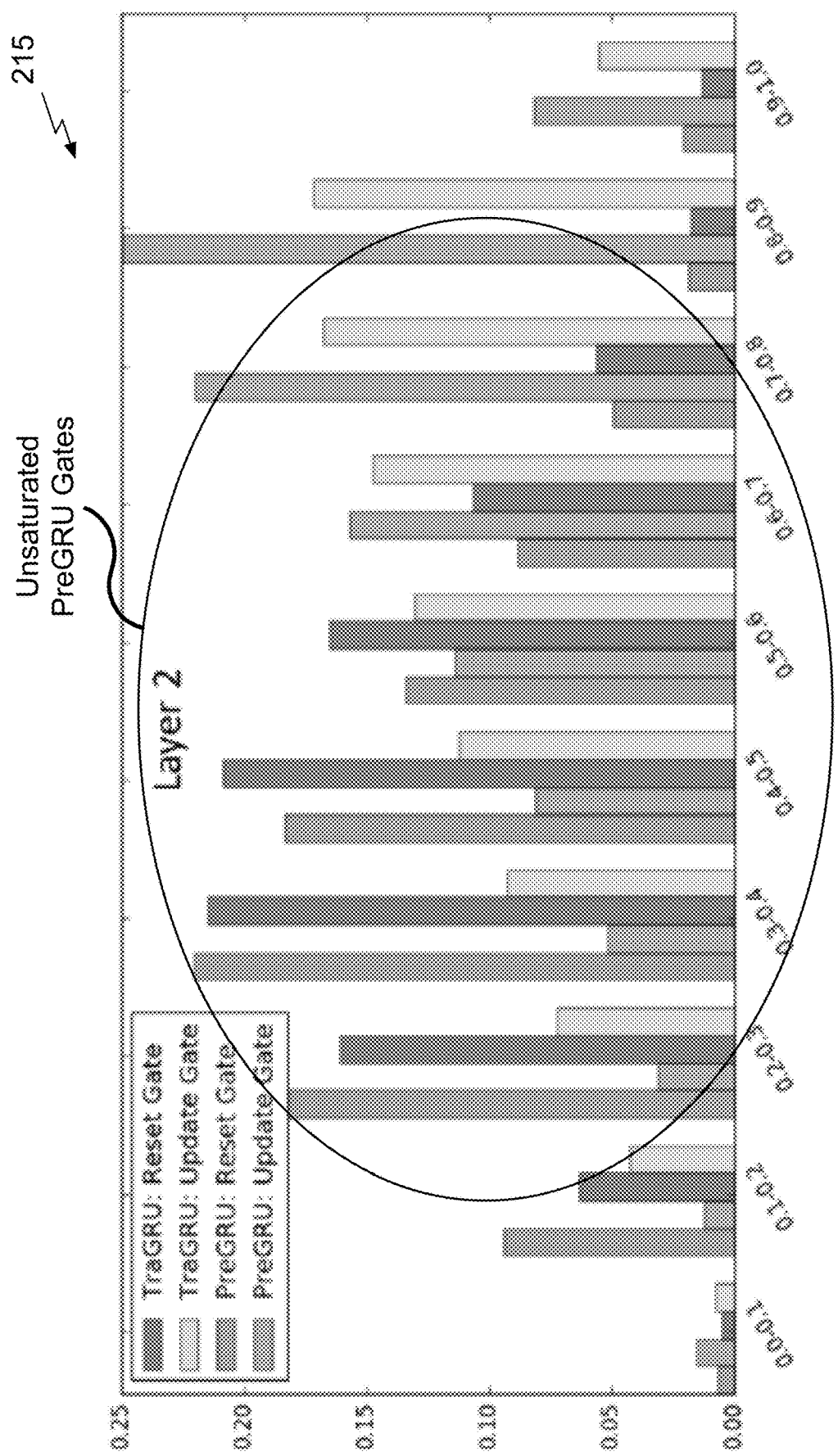
FIG. 2C illustrates an activation histogram over 10 bins for a second layer, in accordance with one embodiment.

FIG. 2C illustrates an activation histogram 215 over 10 bins for a second layer, in accordance with one embodiment. A second layer of the GRU is constructed by a PreRNN layer 135 or 175 to produce a second layer of a visual sequence learning neural network model 115 or 150. The bar graph illustrates the activation histogram for reset and update gate neurons for the second PreRNN layer (PreGRU reset gate and update gate). The bar graph also illustrates the activation histogram for reset and update gate neurons for a second layer of a traditional GRU (TraGRU reset gate and update gate).

For the second layer of PreGRU the distribution of both the reset gate and update gate gather in the unsaturated region in the center of the distribution. Because the distribution of activation values for neurons in the transformed second layer are neither right nor left saturated for the second layer, the second layer of the GRU should not be selected to be transformed into a PreRNN layer 135 or 175. Therefore, for the visual sequence learning neural network model 115 or 150, the first non-recurrent layer of the GRU is constructed by a PreRNN layer 135 or 175 and the second non-recurrent layer of the GRU is not transformed.

Figure 2D:
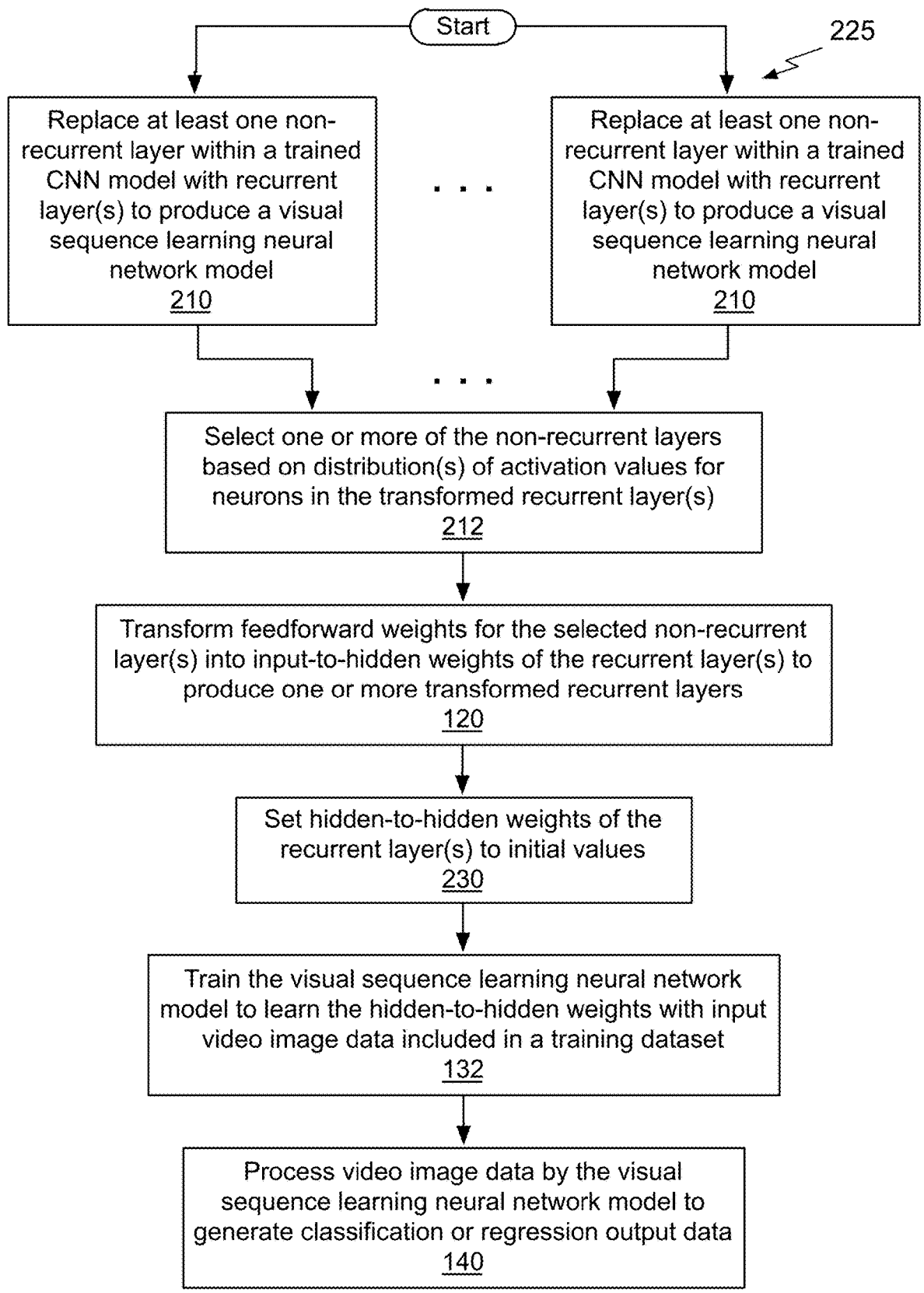
FIG. 2D illustrates another flowchart of a method for visual sequence learning using neural networks, in accordance with one embodiment.

FIG. 2D illustrates another flowchart of a method 225 for visual sequence learning using neural networks, in accordance with one embodiment. The method 225 is described in the context of a neural network model, and the method 225 may also be performed by a program, custom circuitry, or by a combination of custom circuitry and a program. For example, the method 225 may be executed by a GPU, CPU, or any processor capable of performing the necessary processing operations. Furthermore, persons of ordinary skill in the art will understand that any system that performs method 225 is within the scope and spirit of embodiments of the present invention.

At step 210, at least one non-recurrent layer within a trained convolutional neural network model is replaced with a respective PreRNN layer 135 or 175 to produce a visual sequence learning neural network model 115 or 150. Multiple steps 210 may be performed in parallel to replace different combinations of at least one non-recurrent layer.

At step 212, one or more of the non-recurrent layers that were replaced in one of the combinations during steps 210 are selected based on distribution(s) of activation values for neurons in the transformed recurrent layer(s). In one embodiment, non-recurrent layers having activation values with a left and/or right saturation distribution are selected. In one embodiment, the non-recurrent layer(s) that are selected are a combination of at least one convolutional layer or at least one fully connected layer.

Step 120 is performed as previously described in conjunction with FIG. 1A. At step 230, hidden-to-hidden weights of the recurrent layer(s) are set to initial values. Steps 132 and 140 are performed as previously described in conjunction with FIGS. 1A and 1F to complete the training. In one embodiment, replacing one or more non-recurrent layers with PreRNN layer(s) 135 or 175 improves classification accuracy and the resulting visual sequence learning neural network model 115 or 150 converges faster during training compared with a traditional RNN. The faster convergence may be a result of fusing the pre-trained feedforward layers into recurrent layers so that the PreRNN layers 135 or 175 are partially pre-trained and therefore can accelerate convergence.

In one embodiment, one or two fully-connected layers of a pre-trained VGG16 are transformed into a PreRNN layer 175 with unified parameters. As defined in Equations (6), (7), and (10) the pre-trained weights are fused into the PreRNN layers 175. As a comparison, traditional RNNs build corresponding recurrent layers on top of a fully connected seventh layer in VGG16. TABLE 1 shown below demonstrates that PreRNN and PreRNN-SIH both outperform traditional RNNs because an area under the curve (AUC) is greater, where the cumulative error distribution curve represents the normalized point-to-point error for 68 facial landmarks.

TABLE 1

Facial landmark detection accuracy (in AUC) of the
traditional RNNs and the PreRNN and PreRNN-SIH

|  | Traditional | | PreRNN | | | PreRNN-SIH | | |
| --- | --- | --- | --- | --- | --- | --- | --- | --- |
|  | 1 layer | 2 layers | fc6 | fc7 | fc6/7 | fc6 | fc7 | fc6/7 |
| VRNN | 0.704 | 0.716 | 0.757 | 0.742 | 0.763 | — | — | — |
| LSTM | 0.718 | 0.671 | 0.769 | 0.754 | 0.746 | 0.743 | 0.746 | 0.719 |
| GRU | 0.722 | 0.698 | 0.772 | 0.755 | 0.761 | 0.768 | 0.748 | 0.762 |

Transforming the fully connected layers (fc6, fc7 or fc6/7) into PreRNN 175 layers significantly out-performs the traditional RNNs for the three basic recurrent structures. In one embodiment, apart from improving the accuracy, PreRNN-SIH reduces the recurrent parameters by up to 82%. In comparison, among the three basic recurrent structures, LSTM produce similar results to GRU, which both outperform VRNN.

Replacing one or more non-recurrent layers of a pre-trained convolutional neural network model with a PreRNN layer 135 or 175 for visual sequence learning directly transforms pre-trained feedforward layers into recurrent layers. Replacing one or more non-recurrent layers with a PreRNN layer 135 or 175 may be applied to all basic recurrent structures and various architectures of neural networks, particularly CNNs. Extensive experiments on three applications find PreRNN and PreRNN-SIH to produce consistently better results than traditional RNNs, in addition to a significant reduction of recurrent parameters by PreRNN-SIH.

Parallel Processing Architecture

Figure 3:
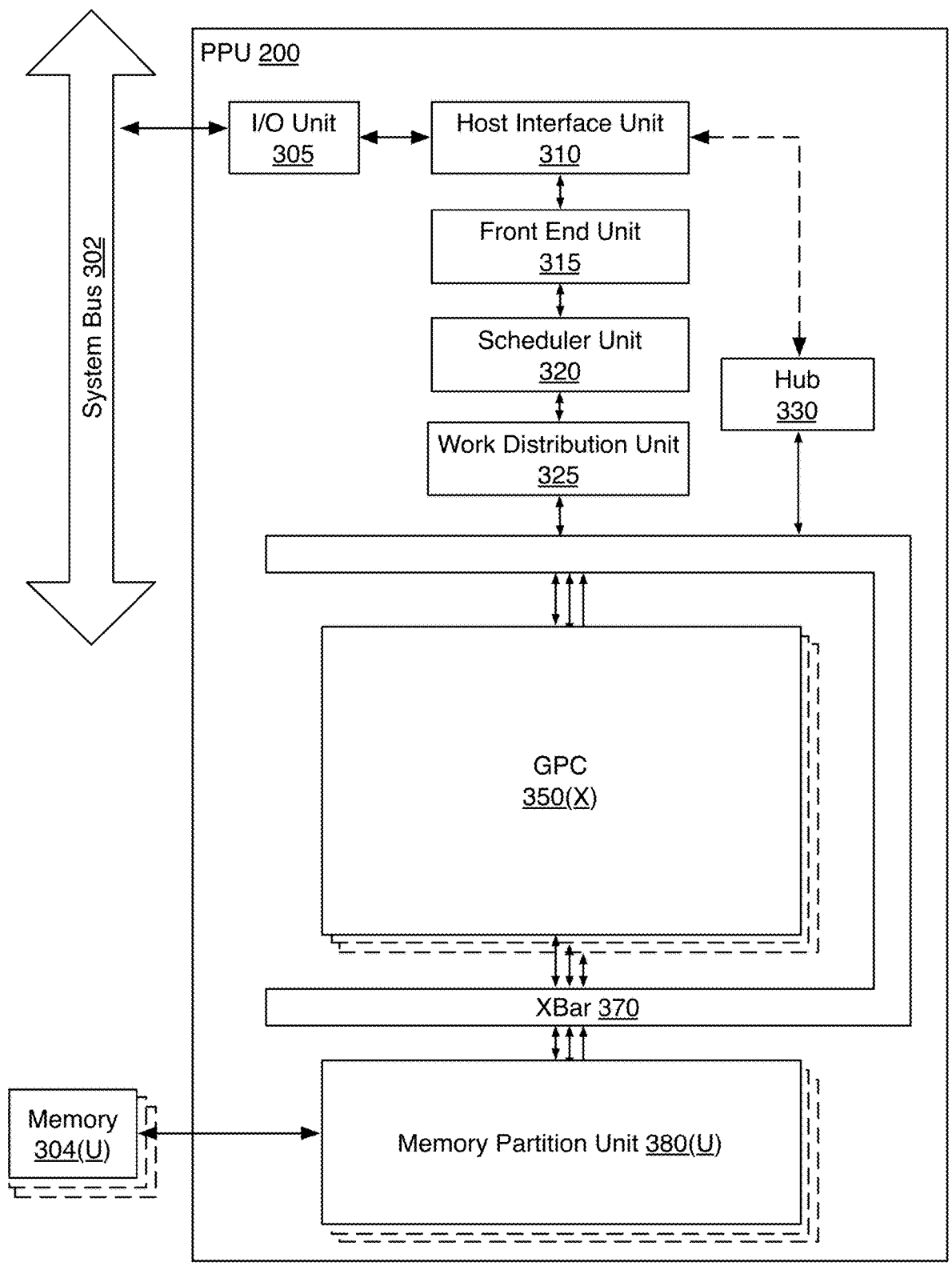
FIG. 3 illustrates a parallel processing unit, in accordance with one embodiment.

FIG. 3 illustrates a parallel processing unit (PPU) 300, in accordance with one embodiment. The PPU 300 may be configured to implement the visual sequence learning neural network model 115 or 150.

In one embodiment, the PPU 300 is a multi-threaded processor that is implemented on one or more integrated circuit devices. The PPU 300 is a latency hiding architecture designed to process a large number of threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise a number of instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
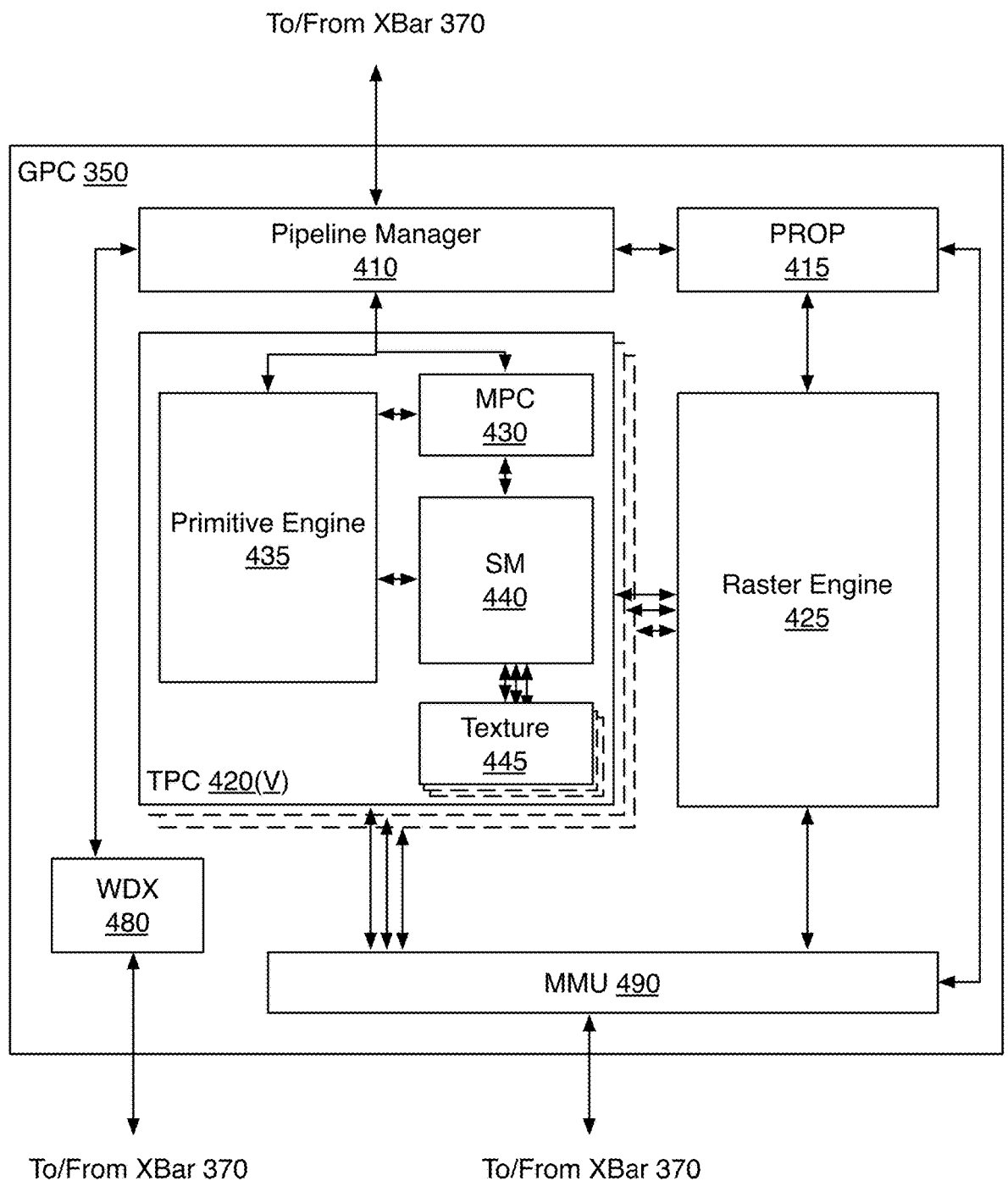
FIG. 4A illustrates a general processing cluster of the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 may be described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for improving translation of virtual addresses into physical addresses in the memory 304.

Figure 4B:
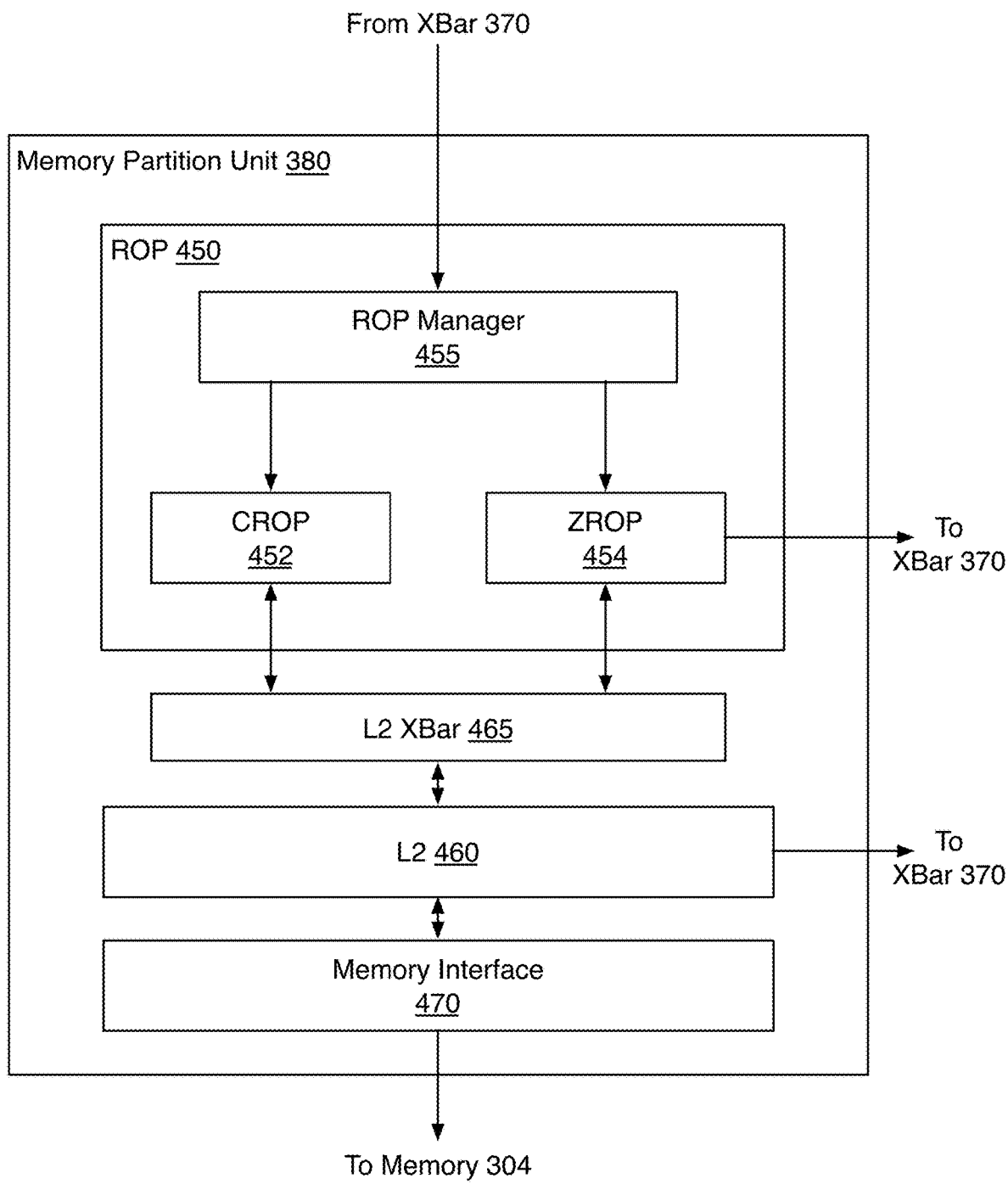
FIG. 4B illustrates a partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 comprises U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
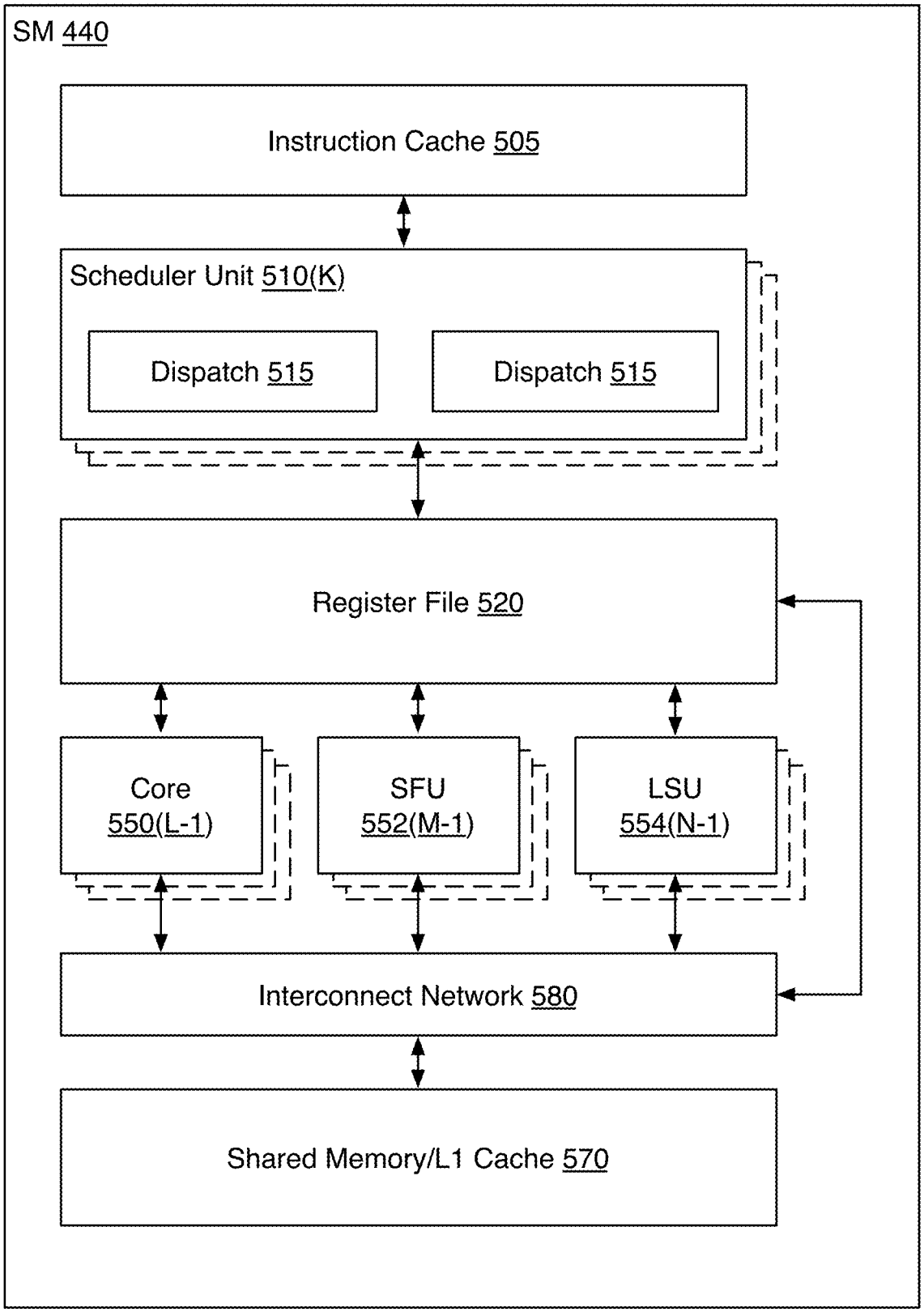
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes.

The PPU 300 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 communicate between threads, and the LSU 554 to read and write Global memory through partition shared memory/L1 cache 570 and partition unit 380.

When configured for general purpose parallel computation, the SM 440 can also write commands that scheduler unit 320 can use to launch new work on the TPCs 420. In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various CNN, FC 135, and RNN 235 layers of the video classification systems 115, 145, 200, 215, and 245. For example, the device driver may launch a kernel on the PPU 300 to implement at least one 2D or 3D CNN layer on one SM 440 (or multiple SMs 440). The device driver (or the initial kernel executed by the PPU 300) may also launch other kernels on the PPU 300 to perform other CNN layers, such as the FC 135, RNN 235 and the classifier 105, 106, or 206. In addition, some of the CNN layers may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
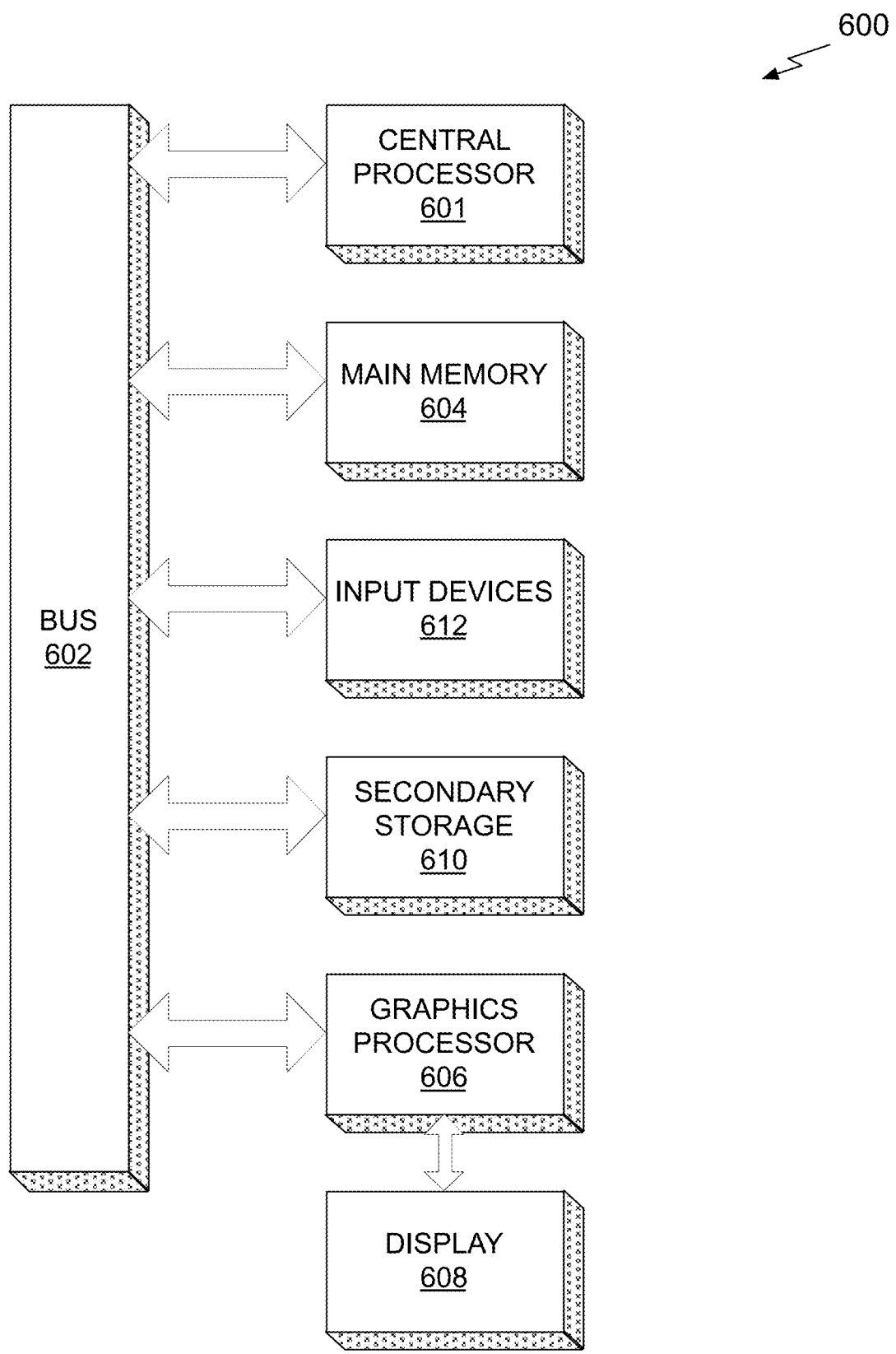
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be used to implement the visual sequence learning neural network model 115 or 150.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, camera, and the like. In one embodiment, the visual sequence learning neural network model may be used to recognize dynamic hand gestures as user input. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. Data streams associated with gestures may be stored in the main memory 604 and/or the secondary storage 610.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, head-mounted display, autonomous vehicle, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
replacing a non-recurrent layer within a trained neural network model with a recurrent layer to produce a visual sequence learning neural network model;
transforming feedforward weights for the non-recurrent layer into input-to-hidden weights of the recurrent layer to produce a transformed recurrent layer;
setting hidden-to-hidden weights of the recurrent layer to initial values; and
processing video image data by the visual sequence learning neural network model to generate classification or regression output data.

2. The method of claim 1, prior to processing the video image data, further comprising:
processing input video image data included in a training dataset by the visual sequence learning neural network model to generate output data;
comparing the output data to target output data included in the training dataset to produce comparison results; and
adjusting the hidden-to-hidden weights based on the comparison results.

3. The method of claim 2, further comprising adjusting the input-to-hidden weights based on the comparison results.

4. The method of claim 2, wherein the training dataset is configured for sequential face alignment and the video image data is color data.

5. The method of claim 2, wherein the training dataset is configured for dynamic hand gesture recognition and the video image data is color data and depth data.

6. The method of claim 2, wherein the training dataset is configured for action recognition and the video image data is color data and optical flow data.

7. The method of claim 1, wherein the non-recurrent layer is a fully-connected layer.

8. The method of claim 1, wherein the non-recurrent layer is a convolutional layer.

9. The method of claim 1, wherein the transforming comprises computing values of parameters for multiple input-to-hidden state corresponding to multiple gating functions of the recurrent layer using the feedforward weights.

10. The method of claim 1, wherein the transforming comprises computing values of parameters for a unified input-to-hidden state corresponding to multiple gating functions of the recurrent layer using the feedforward weights.

11. The method of claim 1, wherein the replacing comprises selecting the non-recurrent layer based on a distribution of activation values for neurons in the transformed recurrent layer.

12. The method of claim 11, wherein fewer activation values for the neurons in the recurrent layer are distributed between 0.1 and 0.9 than are distributed outside of 0.1 and 0.9 within a range 0.0 to 1.0.

13. A system, comprising:
a memory storing video image data; and
a parallel processing unit that is coupled to the memory and configured to:
replace a non-recurrent layer within a trained neural network model with a recurrent layer to produce a visual sequence learning neural network model;
transform feedforward weights for the non-recurrent layer into input-to-hidden weights of the recurrent layer to produce a transformed recurrent layer;

set hidden-to-hidden weights of the recurrent layer to initial values; and process the video image data by the visual sequence learning neural network model to generate classification or regression output data.

14. The system of claim 13, wherein the parallel processing unit is further configured, prior to processing the video image data, to:

process input video image data included in a training dataset by the visual sequence learning neural network model to generate output data;

compare the output data to target output data included in the training dataset to produce comparison results; and adjust the hidden-to-hidden weights based on the comparison results.

15. The system of claim 14, wherein the parallel processing unit is further configured to adjust the input-to-hidden weights based on the comparison results.

16. The system of claim 13, wherein the parallel processing unit is further configured to compute values for multiple input-to-hidden state corresponding to multiple gating functions of the recurrent layer using the feedforward weights.

17. The system of claim 13, wherein the parallel processing unit is further configured to compute values for a unified input-to-hidden state corresponding to multiple gating functions of the recurrent layer using the feedforward weights.

18. The system of claim 13, wherein the parallel processing unit is further configured to select the non-recurrent layer based on a distribution of activation values for neurons in the transformed recurrent layer to transform the feedforward weights.

19. A non-transitory computer-readable media storing computer instructions for visual sequence learning that, when executed by a processor, cause the processor to perform the steps of:

replacing a non-recurrent layer within a trained neural network model with a recurrent layer to produce a visual sequence learning neural network model;

transforming feedforward weights for the non-recurrent layer into input-to-hidden weights of the recurrent layer to produce a transformed recurrent layer;

setting hidden-to-hidden weights of the recurrent layer to initial values; and processing video image data by the visual sequence learning neural network model to generate classification or regression output data.

20. The non-transitory computer-readable media of claim 19, wherein the replacing comprises selecting the non-recurrent layer based on a distribution of activation values for neurons in the transformed recurrent layer.

* * * * *